US006543726B2

(12) United States Patent
Illingworth

(10) Patent No.: US 6,543,726 B2
(45) Date of Patent: Apr. 8, 2003

(54) FLUID FLOW STRAIGHTENING TECHNIQUES

(75) Inventor: Lewis Illingworth, Kensington, NH (US)

(73) Assignee: Vortex Holding Company, Avenel, NJ (US)

( * ) Notice: Subject to any disclaimer, the term of this patent is extended or adjusted under 35 U.S.C. 154(b) by 0 days.

(21) Appl. No.: 09/901,287

(22) Filed: Jul. 9, 2001

(65) Prior Publication Data
US 2001/0036406 A1 Nov. 1, 2001

Related U.S. Application Data

(63) Continuation-in-part of application No. 09/728,602, filed on Dec. 1, 2000, which is a continuation-in-part of application No. 09/316,318, filed on May 21, 1999.

(51) Int. Cl.$^7$ ................................................ B64C 11/48
(52) U.S. Cl. ...................... 244/199; 244/17.23; 416/128
(58) Field of Search ........................... 244/17.11, 17.23, 244/12.2, 199, 65, 69, 23 C; 416/128, 129

(56) References Cited

U.S. PATENT DOCUMENTS

| 2,950,074 A | * | 8/1960 | Apostolescu ............. 244/17.23 |
| 3,149,803 A | * | 9/1964 | Petrides et al. .......... 244/17.23 |
| 4,787,573 A | * | 11/1988 | Pauchard ................. 244/17.23 |
| 5,152,478 A | * | 10/1992 | Cycon et al. ............. 244/12.2 |
| 5,226,350 A | * | 7/1993 | Cycon et al. ............. 244/12.2 |

* cited by examiner

Primary Examiner—Galen L. Barefoot
(74) Attorney, Agent, or Firm—Ward & Olivo

(57) ABSTRACT

Contra-rotating members are used for straightening a fluid flow. The members may take the form of propellers, fans or impellers. The contra-rotation eliminates tangential flow components, and most importantly, eliminates cylindrical vortices. The present invention finds specific use in applications in which toroidal vortices are employed and/or generated.

27 Claims, 4 Drawing Sheets

FLUID FLOW STRAIGHTENING TECHNIQUES

CROSS REFERENCE TO OTHER APPLICATIONS

This application is filed as a continuation-in-part of co-pending application Ser. No. 09/728,602, filed Dec. 1, 2000, entitled "Lifting Platform" which is a continuation-in-part of co-pending application Ser. No. 09/316,318, filed May 21, 1999, entitled "Vortex Attractor."

TECHNICAL FIELD OF THE INVENTION

The present invention relates initially, and thus generally, to flow straightening techniques and apparatus. More specifically, the present invention relates to techniques and apparatus for preventing the formation of cylindrical vortices in applications where they are detrimental to performance. The applications include, but are in no way limited to, vortex attractors (as disclosed in inventor's co-pending application Ser. No. 09/316,318 entitled "Vortex Attractor", which is herein incorporated by reference), VTOL aircraft and lifting platforms (an example of which is disclosed in inventor's co-pending Ser. No. 09/728,602, entitled "Lifting Platform", which is herein incorporated by reference), toroidal vortex attractors (as disclosed in inventor's co-pending Ser. No. 09/829,416, entitled "Toroidal and Compound Vortex Attractor", which is herein incorporated by reference), and toroidal vortex vacuum cleaners (as disclosed in inventor's co-pending application Ser. No. 09/835,084, entitled "Toroidal Vortex Bagless Vacuum Cleaner", which is herein incorporated by reference).

BACKGROUND OF THE INVENTION

The need for flow straightening techniques and apparatus has been well established in the prior art, as well as what has been disclosed in prior applications of the inventor. For example, the prior art has prescribed the use of flow straightening in numerous applications such as gas scrubbers, helicopter rotors and fluid flow control. The inventor has specifically prescribed their use in applications such as toroidal vortex attractors, lifting platforms and vacuum cleaners. For the purposes of understanding the fundamental flow characteristics that make flow straightening useful, the flows of very basic systems will first be examined.

FIG. 1 shows a top view of a common prior art horizontal propeller. The construction consists of a motor 102 coupled to a plurality of blades 100 (in this example, four blades are shown). The blades rotate in accordance with direction 101. FIG. 2 shows a side view of the same system consisting of blades 100 and motor 102. In this view, however, the vertical airflow components 200 are shown, with air drawn downwards through the blades 100 and outwards at the ends of the blades 100. Air drawn downwards through the blades has a pressure, initially lower than ambient, that can be determined using Bernoulli. The outward curvature, however, leads to pressure higher than that above the blades 100. The pressure difference across a curved stream tube is defined by the equation $p=(\rho * V^2)/R$, where "p" is the pressure difference, "$\rho$" is the air density, "V" is the airspeed and "R" is the radius of curvature of the stream tube. The increased pressure beneath the blades adds to the efficiency of the propeller and lift. As seen, the curved airflow 200 forms a partial toroidal vortex 201 and the tips of blades 100.

Of particular concern, however, is the deflection of downward airflow through the blades in the direction of blade movement. This effect is illustrated in FIG. 3. As blades 100 rotate (the direction of rotation is shown by arrow 300), momentum is imparted to the incoming airflow 301 such that it is deflected as shown.

FIG. 4 shows a top view of the air flow 301 of FIG. 3. Again, motor 102 coupled to propeller blades 100. Specifically, the outward radial airflow 400 combines with tangential flow 401 due to the blade movement to form a resultant spiraling air flow 402. The effect is more pronounced when the blade 100 pitch is high.

The radial air movement 400 produces a cylindrical vortex. Such vortices have been exhaustively described by the inventor in prior applications. The cylindrical vortex results in a lowering of the air pressure beneath the propeller that is approximately $p=(\rho * V_t^2)/R_t$, where "p" is the air pressure, "$V_t$" is the tangential air velocity at the tip of propeller 100 produced by its rotation, "$R_t$" is the propeller tip radius and "$\rho$" is the air density. Consequently, there are two conflicting pressure generation systems. The first (the partial toroidal vortex), provides increased pressure and lift, while the second (the cylindrical vortex) leads to decreased pressure and decreased lift.

When very close to the ground and when operating with a high propeller pitch, the cylindrical vortex may predominate leading to a critical loss of lift. Thus, a helicopter, or VTOL (vertical take-off and landing) aircraft when very close to the ground may encounter conditions in which the cylindrical vortex predominates and lift is lost. An attempt to counter this by increasing the propeller pitch will increase the cylindrical vortex and further reduce the pressure beneath the blades and thereby lead to a crash. The inventor theorizes that this effect could solve unexplained crashes of helicopters and VTOL aircraft such as the Osprey.

FIG. 5 shows the addition of flow straightening vanes 500 beneath propeller 100 such that the air that enters 502 the propeller-vane system exits 503 with a vertical motion. However, such a system is cumbersome and could not be practically added to a helicopter. Alternatively, such flow straightening vanes have been integrated into prior systems of the inventor's that utilize an outer shroud or a duct.

Thus, it is clear that in order to properly remove rotational components from a flow, flow straightening techniques are necessary and useful. However, while flow straightening vanes have been useful in prior systems (such systems have been the subject of several of the inventor's co-pending patent applications, several of which have already been incorporated by reference), such systems could benefit from flow straightening techniques in accordance with contra-rotating blades, propellers, or impellers.

SURVEY OF THE PRIOR DISCLOSURES

While the prior art does disclose the use of contra-rotating propellers, no where has their use been disclosed as a means to eliminate cylindrical vortices to increase performance of devices employing toroidal vortices. However, the following represent references that the inventor feels are the most relevant, and still, do not approach the scope of the present invention.

Smith et al U.S. Pat. No. 4,422,342 is directed to a method for flow straightening and sampling gas in the stack of a gas scrubber. In normal operation, the gas has a substantially non-axial flow so as to retain, within the stack, droplets carried by the gas. A flow straightener having flow straightening panels is placed in the chamber of the gas scrubber and lifted into the stack. Gas having an axial flow is then sampled. The flow straightener is then removed from the scrubber, and normal operation is resumed. Smith et al simply provides for removable flow straightening vanes to allow for more accurate sampling of an effluent. Nowhere does Smith et al suggest the use of contra-rotating propellers or the elimination of cylindrical vortices.

Marze et al U.S. Pat. No. 5,634,611 discloses an arrangement for a helicopter rotor in which a flow-straightening stator is fixed into the duct downstream of the rotor. It is mounted so that it rotates in the duct, and includes vanes with an aerodynamic profile that straightens out the airflow downstream of the rotor substantially along the axis of the duct, and are each inclined to the radial direction, from the axis of the duct towards its periphery, and in the opposite direction from the direction of rotation of the rotor, and/or inclined at a slant, from the center of the duct to its periphery and from upstream to downstream of the duct. This arrangement is said by the inventors to increase safety, increase performance and decrease noise. However, Marze et al do not disclose any new method or apparatus for straightening a flow, just a particular arrangement therefor. Moreover, since Marze et al are not concerned in this reference with the lift generation of a helicopter, they cannot appreciate the detrimental effects of a cylindrical vortex, and therefore, cannot contemplate any need for its removal.

Larkin U.S. Pat. No. 5,795,200 teaches a marine propulsion unit having two contra-rotating propellers driven by a single shaft. The propellers are driven through gearing which includes a set of static planetary gears, an external gear, and an internal gear. The gearing is mounted in an oil-filled gear box having three co-axial cylindrical sections. The outer two sections rotate in opposite directions and drive propeller hubs. The intermediate section is stationary and serves as a carrier for the planetary gears and a mount for flow-straightening vanes which support a cylindrical shroud. An angular passage may be provided in the intermediate section to exhaust combustion gases through openings in the outside of the shroud when the unit forms part of an outboard motor. Larkin does disclose contra-rotating propellers, but does not employ them for the explicit purpose of straightening flow since a separate flow-straightening stage between the two propellers is prescribed. Furthermore, nowhere does Larkin appreciate the effects of a vortex flow.

Crockett U.S. Pat. No. 5,816,907 teaches a vehicle air outlet having an outlet bell, an upstream shutoff valve having an open and closed position and a direction control member which is downstream of the shutoff valve. The upstream shutoff valve includes a flow straightener assembly that is functional when the shutoff valve is in a fully opened position and non-functional when the shutoff valve is in a closed position. The shutoff valve is mounted on a rotary shaft in the air outlet, and the flow straightener is mounted on the same rotary shaft with the shutoff valve. Crockett provides an apparatus with flow straightening vanes in order to more effectively direct a fluid flow. Crockett does not appreciate any type of vortex flow, and furthermore, does not disclose any new means of flow straightening.

Cavanagh U.S. Pat. No. 6,151,882 is directed to a turbofan engine construction having a stator portion coupled to and centrally disposed within a rigid casing. A rotor portion is disposed between the rigid casing and the stator portion for rotation about the stator portion. A portion of fluids entering the turbofan are heated between the stator and rotor portions prior to expulsion. The remainder of the fluids entering the turbofan pass unheated through the stator portion prior to expulsion. As a result, the heated fluids are expelled annularly about the unheated fluids. The result is a turbofan engine whose exhaust temperature is reduced. The inventor contemplates the invention's utility to lie in hovercrafts since the reduced temperature of the exhaust will be able to inflate the skirt without burning it. While directed to improved propulsion for a hovercraft, Cavanagh does not propose novel flow straightening means. Further, Cavanagh does not appreciate the effect of cylindrical vortices in hovercraft performance.

Golm et al U.S. Pat. No. 6,206,635 teaches a stator device for an axial flow fan that has two rows of stator elements. The first row of stator elements is disposed axially rearward of the second row of stator elements so as to define an air flow slot therebetween. The object of the stator device is to remove rotational components from the air flow to provide a less turbulent stream, and thereby extract similar cooling power from a smaller fan motor. Golm et al, however, do not utilize contra-rotating members to eliminate rotational components, nor are vortex flows appreciated.

SUMMARY OF THE INVENTION

All systems (particularly, but not exclusively, prior ones disclosed for the first time by the inventor) that utilize a toroidal vortex to develop lift or attraction have comprised flow straightening vanes to prevent formation of parasitic cylindrical vortices. However, there are other means to this end, particularly, a contra-rotating propeller, impeller, or fan. Such an arrangement is ideal for a lifting platform, and finds its preferred embodiment therein. However, its use could be found in any of the toroidal vortex applications mentioned herein.

In short, the flow straightener could comprise a motor, or other drive means, coupled to an appropriately geared axle such that two impellers, propellers, or fans coupled thereto could rotate in opposite directions. This would simplify a lifting platform by eliminating the channel containing flow straightening vanes. A shroud could still be employed for safety, and a dihedral could be added for stability during lift.

Thus, it is an object of the present invention to eliminate cylindrical vortices in applications wherein they are undesirable.

Furthermore, it is an object of the present invention to provide a space-efficient means of straightening a flow.

It is yet another object of the present invention to provide a space-efficient means of eliminating cylindrical vortices.

It an additional object of the present invention to provide improved means for a lifting platform.

It is a further object of the present invention to provide improved means for apparatus utilizing toroidal vortices.

SUMMARY OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. The following presents a detailed description of a preferred embodiment (as well as some alternative embodiments) of the present invention.

Certain terminology will be used in the following description for convenience in reference only and will not be limiting. The words "in" and "out" will refer to directions toward and away from, respectively, the geometric center of the device and designated and/or reference parts thereof. The words "up" and "down" will indicate directions relative to the horizontal and as depicted in the various figures. The words "clockwise" and "counterclockwise" will indicate rotation relative to a standard "right-handed" coordinate system. Such terminology will include the words above specifically mentioned, derivatives thereof and words of similar import.

Figure 1:
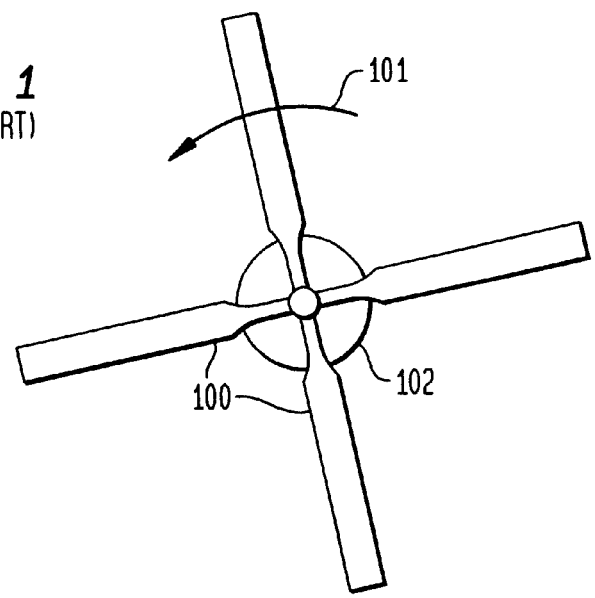
FIG. 1 (PRIOR ART), already described, depicts a top view of a horizontal propeller.
Figure 2:
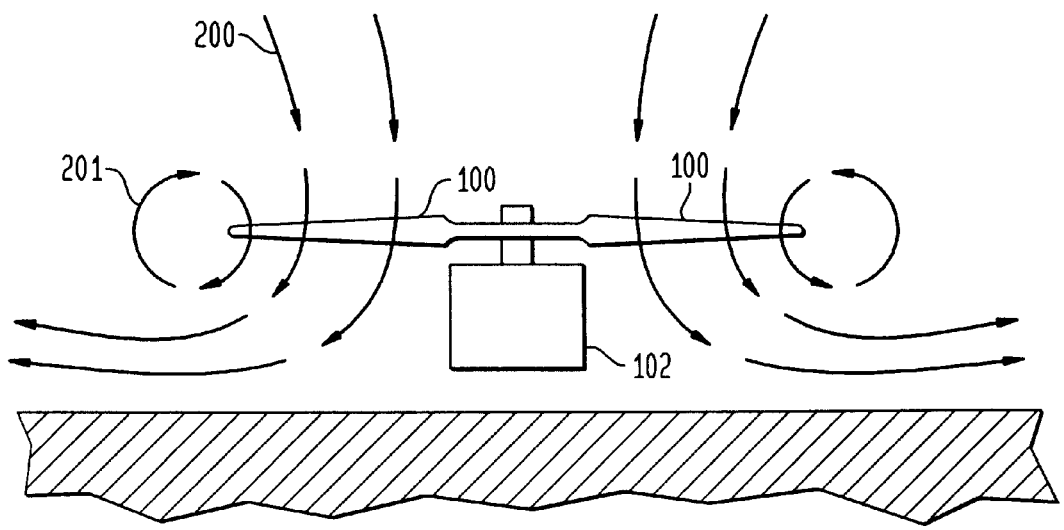
FIG. 2 (PRIOR ART), already described, depicts a side view of a horizontal propeller showing a cross-section of the airflow.
Figure 3:
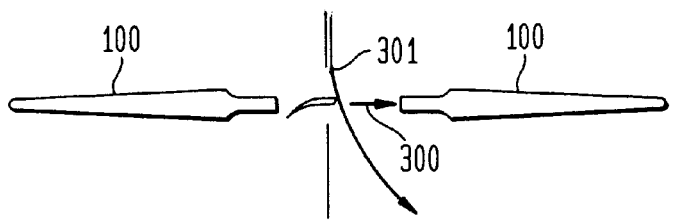
FIG. 3 (PRIOR ART), already described, depicts a side view of a horizontal propeller showing the downward airflow and its tangential component.
Figure 4:
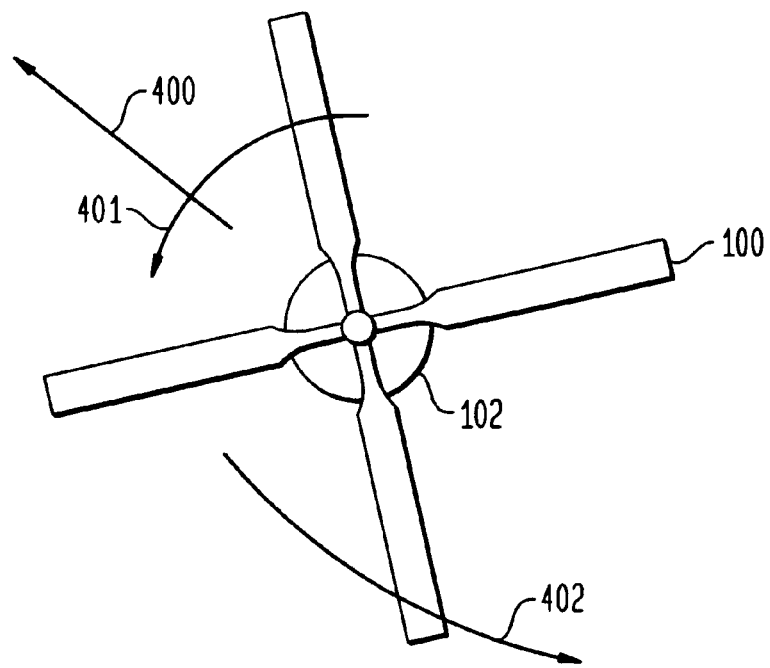
FIG. 4 (PRIOR ART), already described, depicts a top view of a propeller showing airflow components leading to air spiraling outwards underneath the blades.
Figure 5:
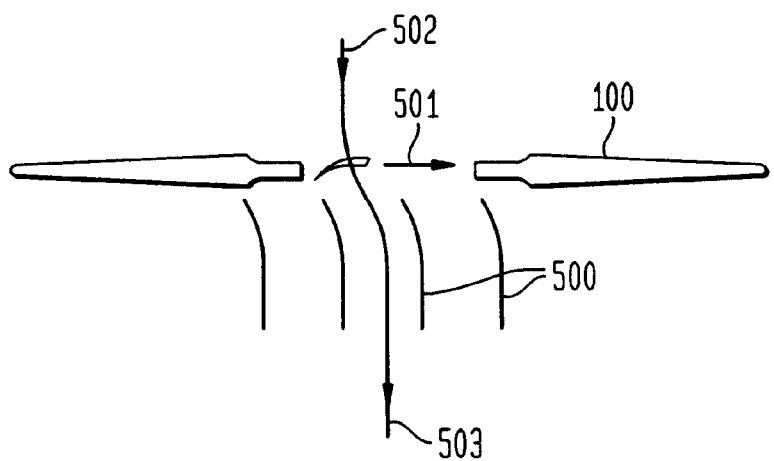
FIG. 5 (PRIOR ART), already described, shows the addition of flow straightening vanes to the system of FIG. 4.
Figure 6:
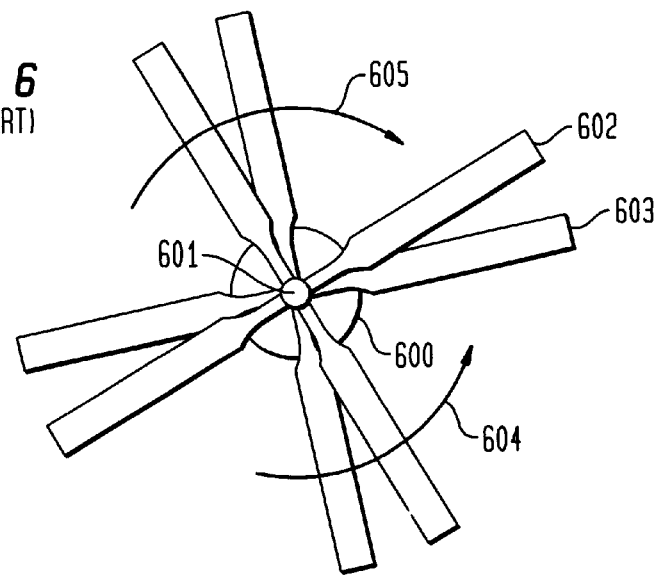
FIG. 6 (PRIOR ART) depicts a top view of contra-rotating propellers.

FIG. 6 shows a typical contra-rotating propeller system. An upper set of blades 602 rotates in anti-clockwise direction 604, and a lower set of blades 603 rotates in a clockwise direction 605. The system is driven by a motor 600 coupled to an axle 601 which blades 602 and 603 are coupled to such that they rotate in said directions.

Figure 7:
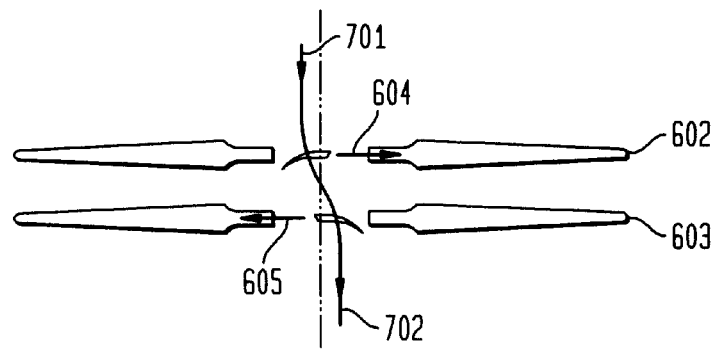
FIG. 7 depicts a side view of contra-rotating propellers showing horizontal air deflection by the upper blades being corrected by the contra-rotating lower blades.

Referring to FIG. 7, when blades 602 (rotating in direction 604) and 603 (rotating in direction 605) are viewed from the side, air 701 passing through the upper blades 602 is pushed downwards with a horizontal component to the right. When the air 701 reaches the lower blades 603, it is further deflected downwards and right hand motion (anti-clockwise from the top) is removed by the lower blades 603 pushing air horizontally to the left (clockwise from the top). The resulting airflow 702 is downwards without any sideways component of motion. Total removal of any sideways (tangential) motion of the air is accomplished by adjusting the relative pitches of the upper 602 and lower 603 blades.

Figure 8:
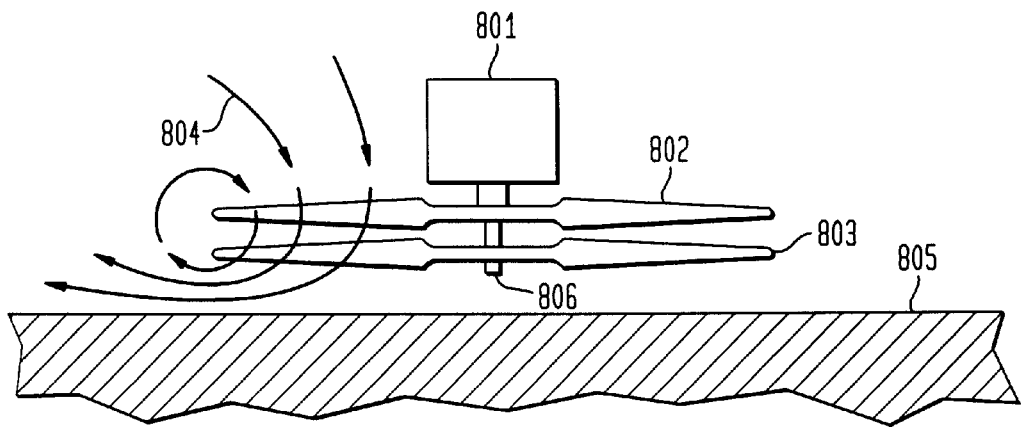
FIG. 8 shows contra-rotating propeller used as a lifting platform.

When such a contra-rotating propeller is operated close to the ground 805, a lifting platform, as illustrated in FIG. 8, is made. The system of FIG. 8 comprises a motor 801 coupled to an axle 806 to which upper blades 802 and lower blades 803 are coupled. Axle 806 is such that upper blades 802 and lower blades 803 rotate in opposite directions. Such axles are well known in the art. The elimination of tangential air movement components that can cause a destructive cylindrical vortex allows the blades to operates close to the ground and generate a large back pressure beneath the blades 802 and 803. The airflow is generally depicted by flowstreams 804. However, this system may be impracticable because of the likelihood of blades 802 and 803 hitting the ground 805.

Figure 9:
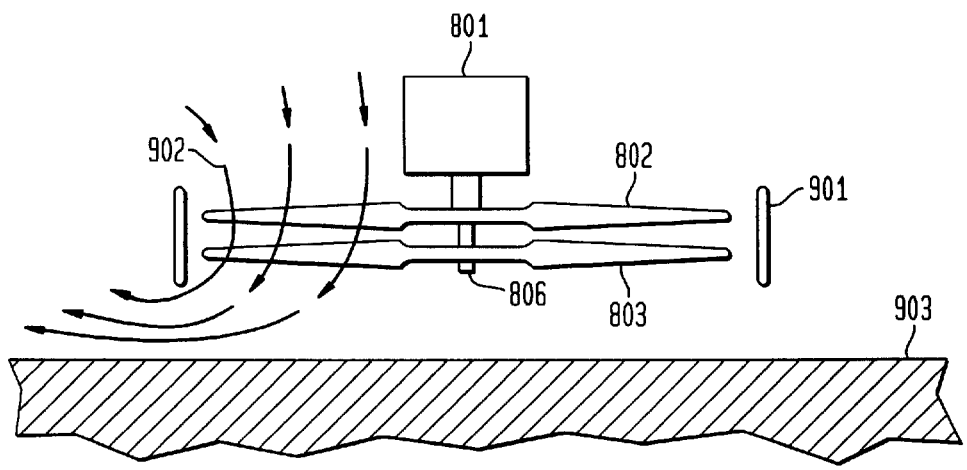
FIG. 9 shows a side view of a lifting platform using contra-rotating propellers with an outer circular shroud.

FIG. 9 shows the system of FIG. 8 with addition of shroud 901 to prevent contact with surface 903. As before, the system comprises motor 801 coupled to axle 806 which is in turn coupled to upper blades 802 and lower blades 803. Particularly, note the elimination of tip vortices from air stream 902 due to the addition of shroud 901. Such an arrangement is superior to prior lifting platform arrangements because the structure needed to support shroud 901 is much less complicated than that required to support flow straightening vanes. The two propellers both provide lift so that the overall system could have a higher overall lifting force to weight ratio than ever before possible.

Figure 10:
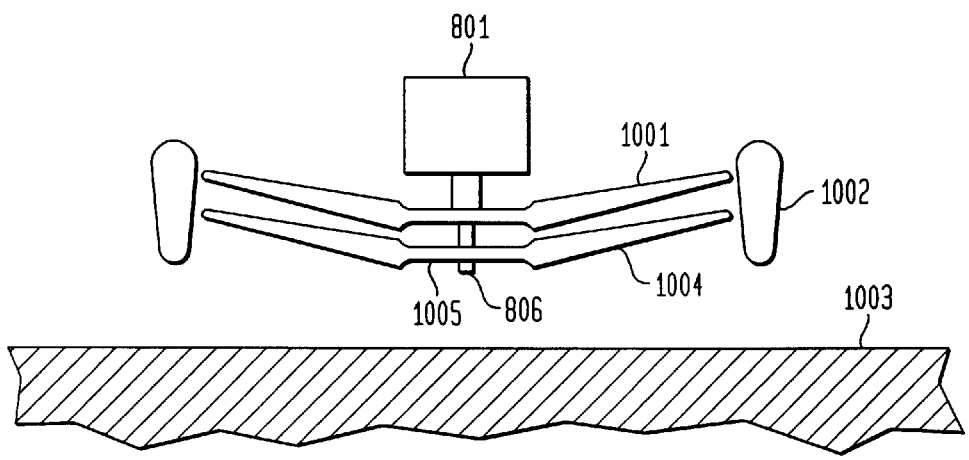
FIG. 10 depicts a side view of a lifting platform using contra-rotating propellers with dihedral.

When the lifting platform is required to fly, the system can be easily modified to enhance performance. Referring to FIG. 10, motor 801 is again coupled to axle 806. This time, upper blade 1001 and lower blade 1004 have a dihedral to enhance stability. Performance close to surface 1003 can be maintained by extending the shroud 1002 downwards to a level slightly below that of the propeller hub 1005.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

I claim:

1. An apparatus for eliminating a cylindrical vortex comprising:

motor means for generating a torque;

axle means, coupled to said motor means, said axle means comprising a first coupling capable of transferring a first torque in the direction of said torque, and further comprising a second coupling, coaxial to said first coupling, capable of transferring a torque in the opposite direction of said torque;

first blade means coupled to said first coupling; and second blade means coupled to said second coupling;

wherein upon application of said torque, said first blade means and said second blade means rotate in opposite directions;

and further wherein the pitch and rotational speed of said second blade means are such that fluid flow, upon traveling through said first blade means and said second blade means, has substantially no cylindrical vortex flow characteristic.

2. An apparatus according to claim 1, wherein said first coupling is above said second coupling.

3. An apparatus according to claim 1, wherein said first coupling is above said second coupling, and further wherein said first coupling rotates in an anti-clockwise direction, and said second coupling rotates in a clockwise direction.

4. An apparatus according to claim 1, wherein said motor means is an electric motor.

5. An apparatus according to claim 1, wherein said motor means is a stored mechanical energy device.

6. An apparatus according to claim 1, wherein said motor means is of the combustion type.

7. An apparatus according to claim 1, wherein said first blade means and second blade means are propellers.

8. An apparatus according to claim 1, wherein said first blade means and said second blade means are fans.

9. An apparatus according to claim 1, wherein said first blade means and said second blade means are impellers.

10. An apparatus according to claim 1, wherein said first blade means and second blade means have a variable pitch.

11. An apparatus according to claim 1, wherein said first blade means and said second blade means have the same pitch.

12. An apparatus according to claim 1, wherein said first blade means and said second blade means have different pitches.

13. An apparatus according to claim 1 wherein said first blade means and said second blade means are surrounded by a shroud.

14. A lifting platform for generating a high pressure region between said lifting platform and a surface, said lifting platform comprising:

motor means for generating a torque;

axle means, coupled to said motor means, said axle means comprising a first coupling capable of transferring a first torque in the direction of said torque, and further comprising a second coupling, coaxial to said first coupling, capable of transferring a torque in the opposite direction of said torque;

first blade means coupled to said first coupling; and second blade means coupled to said second coupling;

wherein upon application of said torque, said first blade means and said second blade means rotate in opposite directions;

and further wherein the pitch and rotational speed of said second blade means are such that fluid flow, upon traveling through said first blade means and said second blade means, has substantially no cylindrical vortex flow characteristic;

and further wherein a toroidal vortex is generated between said lifting platform and said surface, thereby creating a high pressure region therebetween.

15. A lifting platform according to claim 14, wherein said first coupling is above said second coupling.

16. A lifting platform according to claim 14, wherein said first coupling is above said second coupling, and further wherein said first coupling rotates in an anti-clockwise direction, and said second coupling rotates in a clockwise direction.

17. A lifting platform according to claim 14, wherein said motor means is an electric motor.

18. A lifting platform according to claim 14, wherein said motor means is a stored mechanical energy device.

19. A lifting platform according to claim 14, wherein said motor means is of the combustion type.

20. A lifting platform according to claim 14, wherein said first blade means and second blade means are propellers.

21. A lifting platform according to claim 14, wherein said first blade means and said second blade means are fans.

22. A lifting platform according to claim 14, wherein said first blade means and said second blade means are impellers.

23. A lifting platform according to claim 14, wherein said first blade means and second blade means have a variable pitch.

24. A lifting platform according to claim 14, wherein said first blade means and said second blade means have the same pitch.

25. A lifting platform according to claim 14, wherein said first blade means and said second blade means have different pitches.

26. A lifting platform according to claim 14 wherein said first blade means and said second blade means a re surrounded by a shroud.

27. A method of straightening a fluid flow, comprising the steps of:

rotating a first member and a second member in opposite directions;

aligning said first member and said second member coaxially; and adjusting the pitch and the rotational speed of said second member;

wherein said adjusting is performed such that fluid flow, upon traveling through said first blade means and said second blade means, has substantially no cylindrical vortex flow characteristic.

* * * * *